(12) United States Patent
Amir et al.

(10) Patent No.: US 7,934,236 B1
(45) Date of Patent: Apr. 26, 2011

(54) ADVANCED NAVIGATION METHOD FOR MUSIC PLAYERS AND VIDEO PLAYERS

(75) Inventors: Israel Amir, Princeton, NJ (US); Ari Naim, Secaucus, NJ (US); Carlos Ramirez, Newton, PA (US); Jules Egyud, Voorhees, NJ (US)

(73) Assignee: Lee Capital LLC, Wilmington, DE (US)

( * ) Notice: Subject to any disclaimer, the term of this patent is extended or adjusted under 35 U.S.C. 154(b) by 1762 days.

(21) Appl. No.: 10/313,688

(22) Filed: Dec. 6, 2002

Related U.S. Application Data

(60) Provisional application No. 60/352,816, filed on Jan. 30, 2002.

(51) Int. Cl.
*G06F 3/01* (2006.01)

(52) U.S. Cl. .............................. 725/53; 725/52; 715/816

(58) Field of Classification Search ................... 725/52, 725/53, 54, 55, 56, 57, 44, 45, 46, 141; 715/257, 715/261, 816; 345/156–179; 455/566; 707/706–708; 704/9, 10, 251, 257
See application file for complete search history.

(56) References Cited

U.S. PATENT DOCUMENTS

| | | | | |
|---|---|---|---|---|
| 5,263,174 A * | 11/1993 | Layman | ........................ | 715/841 |
| 5,278,673 A * | 1/1994 | Scapa et al. | .................... | 358/473 |
| 5,555,105 A * | 9/1996 | Shahir et al. | ................... | 358/473 |
| 5,818,437 A * | 10/1998 | Grover et al. | ................. | 715/811 |
| 6,005,565 A * | 12/1999 | Legall et al. | ................... | 715/721 |
| 6,799,303 B2 * | 9/2004 | Blumberg | ..................... | 715/257 |
| 6,829,668 B2 * | 12/2004 | Keskar et al. | ................. | 710/305 |
| 6,865,746 B1 * | 3/2005 | Herrington et al. | ............. | 725/53 |
| 7,142,934 B2 * | 11/2006 | Janik | ................................ | 700/94 |
| 7,152,213 B2 * | 12/2006 | Pu et al. | ........................ | 715/812 |
| 2002/0069412 A1 * | 6/2002 | Philips | ............................ | 725/43 |
| 2002/0151327 A1 * | 10/2002 | Levitt | ............................. | 455/556 |

OTHER PUBLICATIONS http://electronics.cnet.com/electronics/0-6342420-1305-5603188-1.html?tag—rating.
http://www.creativepro.com/story/review/15009.html.
P. Stokas; "Which is the best low-bitrate audio compression algorithm?"; Mar. 2002; http://ekei.com/audio.

* cited by examiner

*Primary Examiner* — Andrew Y Koenig
*Assistant Examiner* — Jasmine Stokely-Collins
(74) *Attorney, Agent, or Firm* — Stolowitz Ford Cowger LLP

(57) ABSTRACT

A content navigation method that may be used with a storage device that holds multiple content objects includes a controller, at least one search switch and at least one control switch. Each of the content objects has a corresponding name which includes at least one character from an alphabet. The controller determines a set of names of the stored content that corresponds to the activation of the search switch, displays at least one name the set of names and, responsive to the control switch, selects the content object corresponding to the displayed name. The search switches may include multiple search switches, each associated with a predetermined set of letters from the alphabet. Alternatively, each switch may have an corresponding display and may be associated with a dynamically determined set of letters based on their frequency of occurrence in the names.

41 Claims, 13 Drawing Sheets

| Line 1: | B | I | L | L | Y | | | | | | | |
|---|---|---|---|---|---|---|---|---|---|---|---|---|
| Line 2: | T | R | A | C | K | 1 | | | | | | |

FIG. 2A

| Line 1: | B | I | L | L | Y | / | T | T | L | | | |
|---|---|---|---|---|---|---|---|---|---|---|---|---|
| Line 2: | | | | | | | | | | | | |

FIG. 2B

| Line 1: | B | I | L | L | Y | / | T | T | L | - | P | |
|---|---|---|---|---|---|---|---|---|---|---|---|---|
| Line 2: | | | | | | | | | | | | |

FIG. 2C

| Line 1: | B | I | L | L | Y | / | T | T | L | - | P | |
|---|---|---|---|---|---|---|---|---|---|---|---|---|
| Line 2: | - | | | | | | | | | | | |

| | B | I | L | L | Y | / | T | T | L | - | P | |
|---|---|---|---|---|---|---|---|---|---|---|---|---|
| Line 1: | B | I | L | L | Y | / | T | T | L | - | P | |
| Line 2: | * | | | | | | | | | | | |

| | B | I | L | L | Y | / | T | T | L | - | P | |
|---|---|---|---|---|---|---|---|---|---|---|---|---|
| Line 1: | B | I | L | L | Y | / | T | T | L | - | P | |
| Line 2: | * | * | * | * | | | | | | | | |

| | B | I | L | L | Y | / | T | T | L | - | P | |
|---|---|---|---|---|---|---|---|---|---|---|---|---|
| Line 1: | B | I | L | L | Y | / | T | T | L | - | P | |
| Line 2: | C | R | A | Z | Y | | | | | | | |

| | B | I | L | L | Y | / | T | T | L | - | P | |
|---|---|---|---|---|---|---|---|---|---|---|---|---|
| Line 1: | B | I | L | L | Y | / | T | T | L | - | P | |
| Line 2: | B | U | B | X | Y | | | | | | | |

| Line 1: | T | T | L | | | | |
| Line 2: | L | | | | | | |

FIG. 4A ~110

| Line 1: | T | T | L | | | | |
| Line 2: | T | | | | | | |

FIG. 4B ~110

| Line 1: | T | T | L | | | | |
| Line 2: | T | E | | | | | |

FIG. 4C ~110

| Line 1: | T | T | L | | | | |
| Line 2: | T | A | | | | | |

FIG. 4D ~110

| Line 1: | T | T | L | | | | |
| Line 2: | T | A | R | A | R | A | M |

FIG. 4E ~110

ADVANCED NAVIGATION METHOD FOR MUSIC PLAYERS AND VIDEO PLAYERS

CROSS-REFERENCE TO RELATED APPLICATIONS

This application claims the benefit of U.S. Provisional Application No. 60/352,816, filed Jan. 30, 2002, the contents of which are incorporated herein by reference.

BACKGROUND

The present invention concerns a method for finding content on a music player or video player and in particular, such a method that employs a structured directory that is navigated using a small number of user controls.

Mobile digital music players have been improving rapidly in the last few years. Memory cost reduction and falling prices of other electronic components have further helped accelerate the adoption of these devices. Current digital music players are extremely small and some have storage devices (e.g. a 10-20 gigabyte (GBYTE) hard-disk (HD)) that can hold thousands of titles, also referred to herein as content objects. Similarly, currently available compact disc MPEG I, audio level 3 (CD-MP3) players can play as much as 20 hours of music with a single CD; 700 megabytes (MBYTES) of CD space translates to more than 200 titles (assuming about 3 MBYTES per title). With the increased compression efficiency, the number of titles that a single CD may carry would more than double (e.g., using Windows Media Audio™ (WMA) or MP3pro).

Because digital music players can store a large number of titles, it is highly desirable that they be provided with a method for easy navigation across title names, artist names, genre names and other type of search cross sections. Current systems have attempted to address this problem. For example, in their MOJO™ music player, TDK introduced a way to simplify the title search traditionally done with ID3 tags. This system allows a user to associate each file with a title, artist name and genre and then to search for the file in any of these categories. The iPOD™ also introduced improved methods for navigation. The iPOD system also allows users to navigate using different categories. In addition. this system employs a thumb-wheel which allows a user to rapidly navigate the lists in the categories. Digital music players, however, because they desirably have a small footprint, typically have a small display screen and have only a small area left for buttons or switches. These design constraints make it difficult to design and implement an ergonomic navigation system.

SUMMARY OF THE INVENTION

The present invention is embodied in a content navigation method for use with a storage device that is configured to store multiple content objects. Each of the content objects has a corresponding name which includes at least one character from an alphabet. The storage device is controlled by a controller that is coupled to a control switch and at least one search switch. According to the method, the controller determines a set of names of the stored content that corresponds to the activation of the at least one search switch, displays at least one name the set of names, and, responsive to the control switch, selects the content object corresponding to the displayed name.

According to one aspect of the invention, the multiple search switches are each assigned respectively different sets of letters from the alphabet.

According to another aspect of the invention, the controller includes a multiple displays associated with the multiple search switches. The letters of the alphabet are assigned to the switches based on their relative frequency of occurrence in the names of the content objects and the letters assigned to each switch are displayed on the associated multiple displays.

According to another aspect of the invention, the controller includes a single search switch. The names of the content objects are sorted by frequency of occurrence of their initial characters and responsive to the activation of the search switch, the controller displays the initial characters of the names of the content objects in their sorted order.

According to yet another aspect of the invention, the controller includes first and second search switches. The names of the content objects are sorted by their order in the alphabet, an entry approximately at the middle of the sorted list is displayed and, responsive to activation of the first or second switch, the controller performs a binary search of the sorted list.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIGS. 2A, 2B, 2C, 2D, 2E, 2F, 2G and 2H are front plan drawings of the display of the portable audio device shown in FIG. 1 which are useful for describing the operation of the invention.

FIGS. 4A, 4B, 4C, 4D and 4E are front plan drawings of the display of the portable audio device which are useful for describing the operation of the invention.

DETAILED DESCRIPTION

Figure 1A:
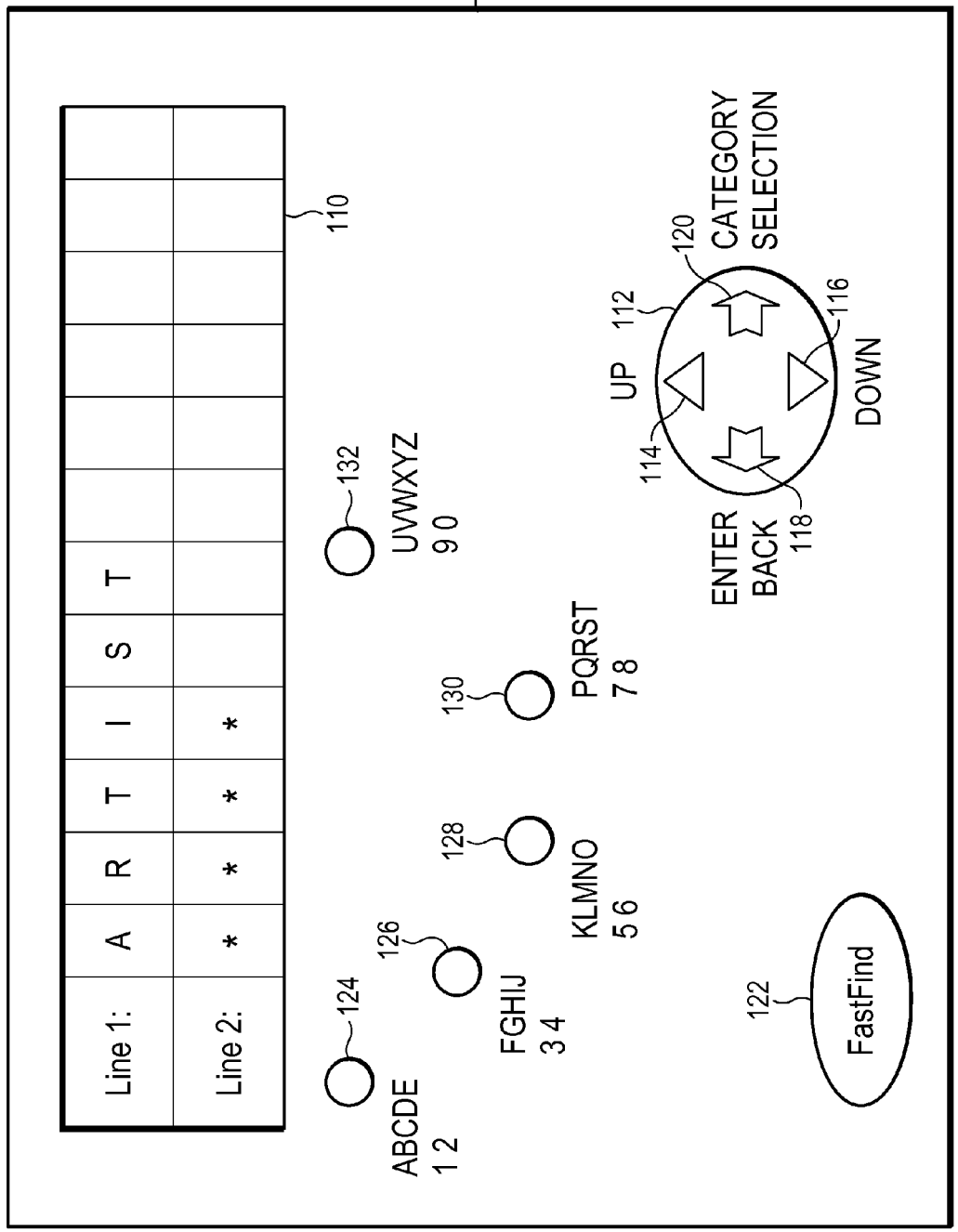
FIG. 1A is a front plan drawing of a portable audio device that includes a first exemplary navigation system according to the present invention.

The present invention is embodied in navigation methods that are suitable for devices with a small number of control buttons such as available for example on a CD player or a DVD player remote control. These methods provide substantial improvement over other methods. Among the devices that we target are: DVD players and networked set-top-boxes (display is either on TV or an small display on the DVD), CD-MP3 players, HDD Jukeboxes, and other large memory hand held devices (for example, devices that will use large FLASH memory, MATRIX type memory, DATAPLAY, micro-drives etc).

The described method is suitable for either networked or conventional DVD players. Many of today's players can also play MP3 titles (or other compressed music). Navigation within the title names on a CD (or a few of them when the DVD includes a changer) would also become better with the methods we introduce in this application.

Other types of devices that may benefit from such navigation tools are clients to personal computers (PCs) in the home environment (e.g., networked players). These clients typically have access to a large collection of titles stored on the HDD of the PC. Networked DVDs and STBs, in particular, may benefit from the present invention.

The described method is influenced by the AUDIX™ PBX system. In the Audix system one can find a name from a directory of names by using the dialing buttons. This system uses a conventional telephone keypad. Eight or nine of the twelve buttons on the keypad are associated with letters, three letters per button. A caller who wants to access a name in the directory, enters a number sequence corresponding to the letters in the name. For example, if the caller wants to access the directory entry for Jane Smith he or she would first press the button 7 (corresponding to the letter "S"). The first name in the directory starting with the letter corresponding to the letters represented by the number 7 (P, R, S) would then appear on the screen followed by name phone number. If it happens that this name is "Samuel" and not "Smith," the user would press the button 6 (corresponding to the letter "M"). Again, if the name appearing on the screen is not "Smith" the user would continue to press buttons 4, 8 and 4 corresponding to the respective letters "I," "T" and "H" until the right name appears. If after the last letter has been entered, Jane Smith's name has not appeared on the screen, an auxiliary button allows the user to manually scroll through all the possible matching names (e.g., other people with the name "Smith," "Smithy," "Smithson" and others that match the sequence represented by the combination 7, 6, 4, 8 and 4). This way the user arrives at searched NAME in an efficient and fast manner.

The search method of the present invention can use fewer than eight or nine search buttons to represent the 26 English letters. One exemplary embodiment, described below with reference to FIGS. 1A through 2H uses only five search buttons. Other methods according to the present invention may use more or fewer search buttons. When there are only a few buttons, the distribution of letters among the buttons can affect the ease of use of the invention. The present invention employs three alternate ways to distribute the letters, each of these is described below. As used herein, the terms "button," "switch" and "key" are used interchangeably to represent a transducer, the activation of which is sensed by control circuitry in the device being controlled. While these devices are described as momentary-contact push-button switches, it is contemplated that other types of transducers (e.g. magnetic, capacitive or proximity transducers) may be used.

The first method is to uniformly distribute the letters over the search buttons in groups of five (for five buttons) and groups of six (for four buttons). In case of five buttons the last button is assigned six letters (ABCDE, FGHIJ, KLMNO, PQRST, UVWXYZ). In case of the four buttons, the last two buttons are each assigned seven letters (ABCDEF, GHIJKL, MNOPQRS, TUVWXYZ)

The second method non-uniformly distributes the letters on each search button (but still according to the order of the alphabet) to increase the speed at which the user's choice may be determined. This may be done adaptively if, for example, the choice of the letter distribution can be dynamically displayed, for example, on small display devices positioned proximate to the buttons. The assignment of letters to the search buttons may be based on a dynamic analysis of the name list of currently stored titles.

The third method is to present the letters according to their frequency of occurrence. In one exemplary embodiment the association of search buttons with letters may be dynamically allocated (vs. an a priori set). For example, if most titles (in case we search for a title) start with the letter T, the first search button is assigned the letter T. If the second most likely first letter for titles is E, the second button is assigned the letter E and so on. As each letter is selected, the letters may be reassigned to the search buttons based on the frequency of occurrence of the letters following the first selected letter or letters.

The frequency of occurrence of a letter or other character in a name may be determined by calculating a histogram for each letter or other character in the alphabet over the names. If, as described below, the search is limited to a particular letter position then the histogram may also be limited to letters in that position. To implement some of the embodiments described below, it may be desirable to calculate multiple histograms. The exemplary histogramming operation(s) may be performed in real time or it (they) may be pre-calculated and updated when a name is added to or deleted from the database.

Another exemplary embodiment, described below, uses only an UP-DOWN button for navigation. This exemplary method uses an alphabetically sorted list of titles which is halved with each press of one of UP or DOWN buttons. At each step, the user merely press the UP button or the DOWN button based on the position of the desired title relative to the currently displayed one. This method implements a binary search of the title list. With each press of a button the number of possible entries in the list is halved. The maximum number of button presses to reach the desired entry is $O \log_2(N)$ where N is the number of entries in the list. If, for example, the list includes 1024 titles, the user may be guaranteed to find a match with at most ten button presses.

Figure 5:
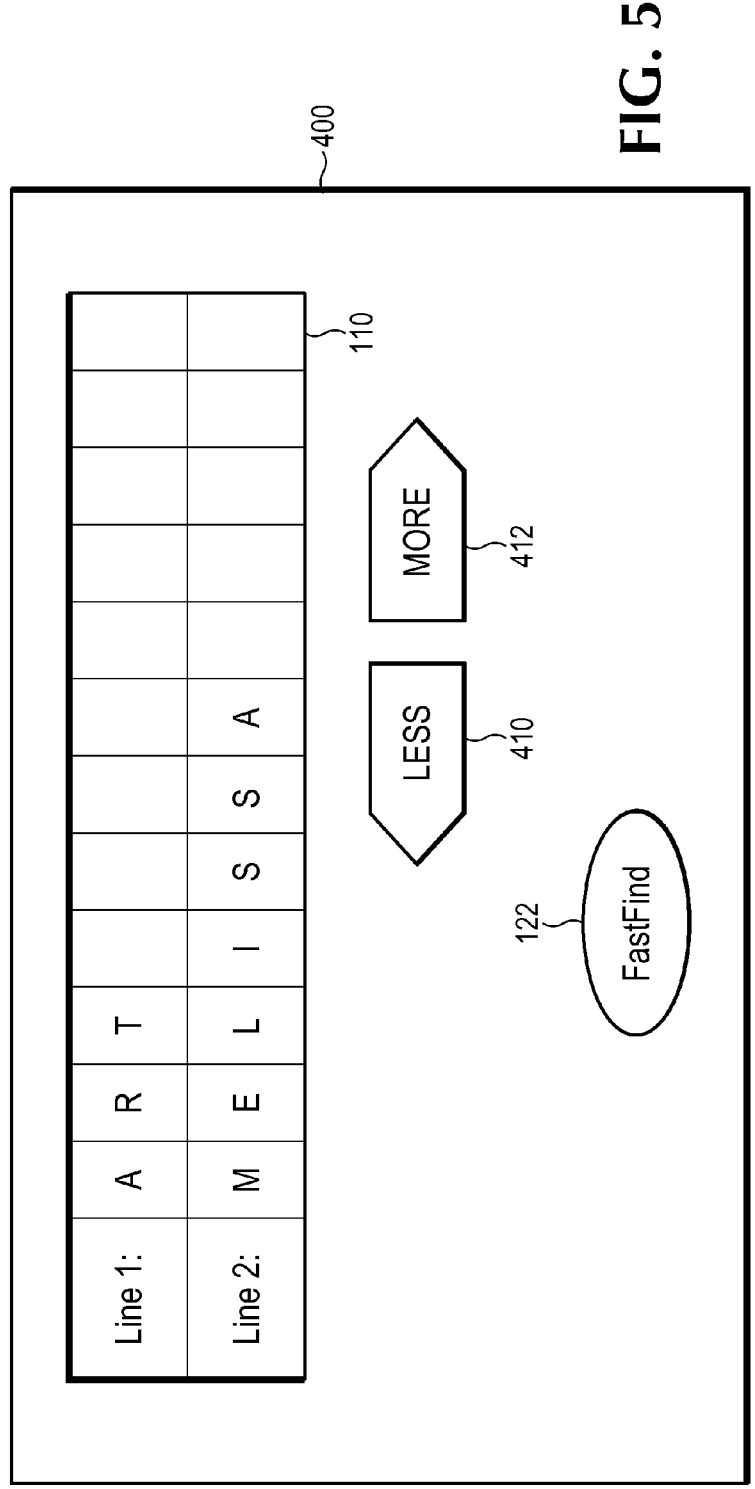
FIG. 5 is a front plan drawing of a portable audio device that includes a second exemplary navigation system according to the present invention.

Each of these methods is described in detail below. The descriptions of the first three methods are made with reference to an exemplary portable device such as is shown in FIG. 1A. This device includes five search buttons, 124, 126, 128, 130 and 132 to which letters are assigned, and one circular navigation button 112 with the equivalent of four direction buttons 114, 116, 118 and 120. Also, the exemplary music player includes a button FF (FAST FIND™) 122. As shown in FIG. 1, the portable device 100 includes an LCD text display 110 which, in these examples, consists of two lines of 12 5×7 character cells, referred to herein as Line 1 and Line 2. It is contemplated, however, that other numbers of letter buttons may be used, that the navigation buttons 112 and FAST FIND button 122 may be eliminated and that a smaller or larger display may be used. The last method, described below with reference to FIG. 5, employs only three buttons: LESS, MORE and FAST FIND.

Figure 1B:
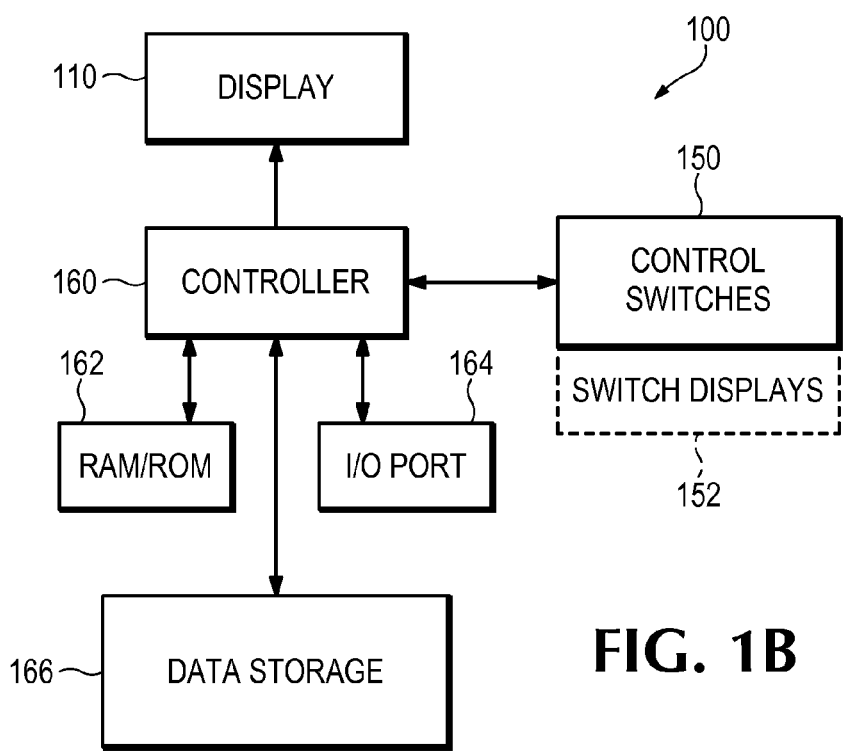
FIG. 1B is a block diagram of circuitry suitable for use in the digital audio device shown in FIG. 1A.

FIG. 1B is a block diagram of circuitry suitable for use as any of the exemplary portable audio players described herein. The exemplary player 100 includes a display 100 and control switches 150, which may include the search switches 124, 126, 128, 130 and 130, the FF button 122 and the circular multiple switch button 112, described above. Alternatively, the control switches may include any of the other control switch configurations described below. In case of networked devices the data storage or even the controller may not reside on the device but elsewhere on a remote server either in the home or on the Internet. Associated with the control switches 150 are optional switch displays 152 (shown in phantom) which are described below with reference to FIGS. 3A through 3F. Both the display 110 and the control switches 150 are coupled to a controller 160. In the exemplary embodiment of the invention, the controller 160 may be a digital signal processor (DSP) or a conventional microprocessor. The controller 160 is coupled to random access memory/read only memory (RAM/ROM) 162 which holds the operating program of the controller and temporary data space for use by the controller. Also coupled to the controller is an input/output (I/O) port 164 through which data files are written to or read from a data storage memory 166 which is also coupled to the controller 166. This data storage memory 166 may be any of the memory devices described above, or other memory device suitable for storing relatively large numbers of content files.

The first exemplary search method is described with reference to FIGS. 1A and 2A through 2H. In this embodiment, the 26 letters are distributed with five letters assigned to each of four buttons, 124, 126, 128 and 130 and six letters assigned to the last button 132. This embodiment includes the dedicated button (FastFind™) 122 which is used to enter the search environment and to change search categories. For example, the first FF button-press causes the device 100 to enter into the search environment and sets the search mode to "Title" (the mnemonic TTL appears in Line 1 in this mode). The second time the FF button 122 is pressed, the search mode changes to "artist" (the word ARTIST is shown in Line 1). The third time the button 122 is pressed changes the search mode, once again, to "genre" (the mnemonic GEN is displayed in Line 1 of the display 110). Another button-press changes the mode once again to "playlists" (the word PLAYLISTS is shown in Line 1). These search options are only illustrative, other options may also be used with the subject invention. The FF button 122 also allows the user to exit the search mode as the last option. Assume the device 100 is in the artist search mode. If the UP button 114 or DOWN button 116 is pressed the list of artists is scrolled on Line 2 of the display 110. A particular displayed artist may be selected by pressing the ENTER button 118 when the desired name appears in Line 2 of the display 110.

If one wants to find the artist name by spelling it, the search begins as soon as one of the five search buttons 124, 126, 128, 130 and 132 is pressed. If, for example, the user wants to look for the artist BILLY, the left-most button 124 is pressed first, as the letter "B" is assigned to this button. In one embodiment an asterisk ("*") appears in the left-most position of Line 2 of the display 110. The asterisk is a place-holder character which indicates that an entry was selected but it did not define a unique artist (i.e. there are other artists in the list that begin with the letters A through E). In another embodiment instead of an asterisk, the first likely name may appear on the screen. In yet another embodiment the first likely letter may appear in place of the asterisk. Next the user selects the letter I, the second letter in the word BILLY, by pressing the button 126. If a unique match is found the word BILLY is displayed on the screen, otherwise, the process continues until a match is found or one of the following two events occurs:

1. The user selected the last letter in the name—in our case, Y—and no unique selection is found. The user proceeds to a manual mode.
2. The user elects to continue the selection process manually at any point in the process. This may occur, for example, when the exact spelling from a certain point on is not known.

In this exemplary embodiment, the user enters the manual search mode by pressing the UP button 114 or DOWN button 116 on the circular switch 112. As a result the first match from a list of all matches containing BILLY (and all other words that can be created by pressing the BILLY buttons). Once, the requested artist name is found, the user presses the ENTER button 118 on the switch 112 to indicate that the displayed name has been selected. In one embodiment the name of the chosen artist is then shown on the top line and the first title associated with the artist is shown on the second line (alphabetically). The user may now scroll through the list of titles by the chosen artist by pressing the UP and DOWN buttons, 114 and 116 on the wheel 112. The user then can choose the title he likes by pressing the ENTER button 118. The chosen title is then played.

Instead of scrolling through the titles after an artist is chosen the user can decide to continue and search the artist title-list by pressing the right button 120 (CATEGORY SELECTION) on the wheel 112 until the mnemonic TTL appears in Line 1 of the display 110. Line 1 of the display 110 shows the artist name BILLY followed by a slash ("/") and the mnemonic TTL, indicating that the current search is on titles by the artist BILLY. Again to select a desired title, the sequentially selects search buttons to which the successive letters of the title are assigned. At any time during this process, the user may enter manual mode and scroll through the list of titles by pressing the UP or DOWN keys 114 or 116, respectively. Once the selection is made the user presses the ENTER key 118 to play the title.

The user may also elect to start the search directly with titles. In this case, the user chooses the title mode (described above). The word TTL is displayed in Line 1 of the display 110, indicating that the search is for a title and the search continues in the same manner described above, i.e., the user selects the title by pressing the letters keys to search for the desired title until keys corresponding to a unique name have been pressed or until the user enters manual mode to search the list of titles from the position indicated by the entered letters. This process is the same as described above.

Another mode of operation searches on patterns. This may be used, for example, when the user does not know the entire spelling of the title (or artist) but knows a part of it (or knows that a certain pattern is unique). In the exemplary embodiment, the user may enter this mode by pressing the FastFind button until the pattern search indicator "P" appears in Line 1 of the display 110 following the search subject (e.g. "BILLY/ART-P"). If, for example, the desired title name is "XYZ-abcd", but the user remembers only that the pattern "abcd" appears in the name, the user may employ the pattern search to find the desired title. To find all titles that contain "abcd" the user presses the first search button 124 four times for "abcd". All titles that include the pattern "abcd" (or other combinations of the letters assigned to search key 124) are contained in the title list (clearly, if only one of titles stored in the device 100 contains the pattern it is the only one displayed). As described above, the user may scroll through the list by pressing the UP key 114 and/or DOWN key 116 until the desired title is displayed. Pressing ENTER starts playing the title. In the exemplary embodiment, If an artist name or genre name has been selected, it is shown in Line 1 of the display 110 and the first title name associated with the selected artist or genre name is displayed in Line 2.

FIGS. 2A through 2H illustrate a pattern search after an artist name has been selected. It is contemplated, however, that pattern searching can be done for every category, (e.g. title, artist, genre or playlist). In FIG. 2A, the user has selected the Artist "Billy" and now wants to select a particular title, "BUBXY." The first step in the process is to press button 120 once. This produces a display (not shown) in which the word "Billy" is followed by a slash and the mnemonic GEN. This selection allows a user to search for different genres recorded by the artist Billy. If the button 120 is pressed again, the display 110 shown in FIG. 2B is produced. The display 110 has "BILLY/TTL" in Line 1. This indicates a mode in which the user may search for titles recorded by the artist Billy. If the button 120 is pressed again, the display shows "BILLY/TTL-P" as shown in FIG. 2C. This indicates a mode in which a user may use a pattern search to find a particular title recorded by the artist Billy. Next, the user again presses the ENTER button 118 and an underscore character 210 appears in the left-most position of Line 2 of the display 110. When the user presses the search switch to which the first letter of the desired title is assigned, in this example, switch 124 for the letter "B," an asterisk appears in the left-most position of Line 2, as shown in FIG. 2E, indicating that a letter has been entered. The Asterisk is displayed because titles beginning with multiple ones of the letters associated with switch 124 exist in the database. Next, three more search switches are pressed corresponding to the letters "U," "B" and "X." Again, because multiple titles corresponding to this sequence of buttons exist in the database, Line 2 of the display 110 contains only four asterisks, as shown in FIG. 2F.

In this example, when the last letter, "Y," of the desired title is pressed, Line 2 of the display (not shown) contains five asterisks. This indicates that the database contains more than one entry corresponding to the sequence of buttons. If BUBXY was the only title corresponding to the sequence of buttons, it would have been shown in Line 2 of the display 110 after step 2F. At this point, because no title is displayed and there are no more letters to enter, the user presses the ENTER button 118 and the display shown in FIG. 2G is produced. Line 2 of the display contains the title CRAZY, which also corresponds to the sequence of buttons pressed to access the title BUBXY.

If manual mode is selected the user can scroll using the UP-DOWN keys. At this point in the example, the user presses the ENTER button 118 to switch to manual mode and presses the DOWN key 116. Using the UP key 114 and the down key 116, the user may display all of the titles corresponding to the sequence of search buttons. In this instance, the next entry in the list is the desired title "BUBXY," as shown in FIG. 2H. The user next presses the ENTER button 118 to begin playing the title.

Another mode of operation allows the selection of a specific letter or a string of letters with which a title/artist/genre name can start. After specifying the letter or string of letters, the user presses the ENTER button 118 and manually searches the list of titles corresponding to the specific string using the UP and DOWN buttons 114 and 116. This method allows a user to search based on a string of predefined letters in order to get quickly to the desired title. For example, if the user knows that the desired title starts with a "V" and there is only one title in the database that starts with a "V," the user can force first letter of the title to be V by quickly pressing the search button 132 twice ("V" is the second letter in the set of letters assigned to the button 132.)

The second approach, described above, is similar to the first approach except that the letters are not distributed evenly but according to another formula. Sometimes it would make sense to allocate fewer letters to some of the search keys and more to others (i.e. (ABC) (DEFG) (HIJ) (KLMNOPQ) (RSTUVWXYZ)).

One can make the distribution adaptive by providing controlled displays under the search buttons, as illustrated below with reference to FIGS. 3A through 3D. In one exemplary embodiment, the letters are assigned according to their distribution in the database. For example, when the first letter of the title is being entered into the left-most position of Line 2 of the display, the letters associated with the first button are all the first letters of the titles in the top one fifth of the sorted list (when the sorting is done on the first letter). So the first search button can be associated with only one letter (this can happen, for example, if may of the titles are named TRACKxxx) or with as many as 10 or more letters. For example, the first search key can be associated with the letters A, B the second search key with C, E, F, H, J and so on. Note that some letters may not appear on the list if no title in the database contains these letters.

FIGS. 3A through 3D show a portable audio device 100 according to the present invention which includes small displays 125, 127, 129, 131 and 133 below their respective search buttons 124, 126, 128, 130 and 132. These displays show the letters assigned to each respective button, where the letters are assigned based on their relative frequency of occurrence. In the examples shown in these Figures, the most frequently occurring first letter for the artist's name is "T" and, so, the letter "T" is shown in display 125 as the only letter assigned to button 124. The second most frequently occurring letter is "E." This letter is shown in display 127 as being assigned to button 126. Artist's names beginning with the letters "R," "N" and "L" occur with approximately equal frequency, so these letters are shown in display 129 as being assigned to key 128. In the exemplary embodiment, artist's names beginning with the letters, "A," "B," "C," "D," "F," "G," "H," "I" "J," "K," "M," "O," "P," "Q," "R," "S," "T" "U," "V," "W" and "Y" occur with about equal frequency. Consequently, in this exemplary embodiment, the letters "A," "B," "C," "D," "F," "G," "H," "I," "J" and "K" are shown in display 131 as being assigned to button 130 and the remaining letters are shown in display 133 as being assigned to button 132. Note that the letters "X" and "Z" do not appear in any of the small displays because no artist's name in the list begins with these letters.

Figure 3A:
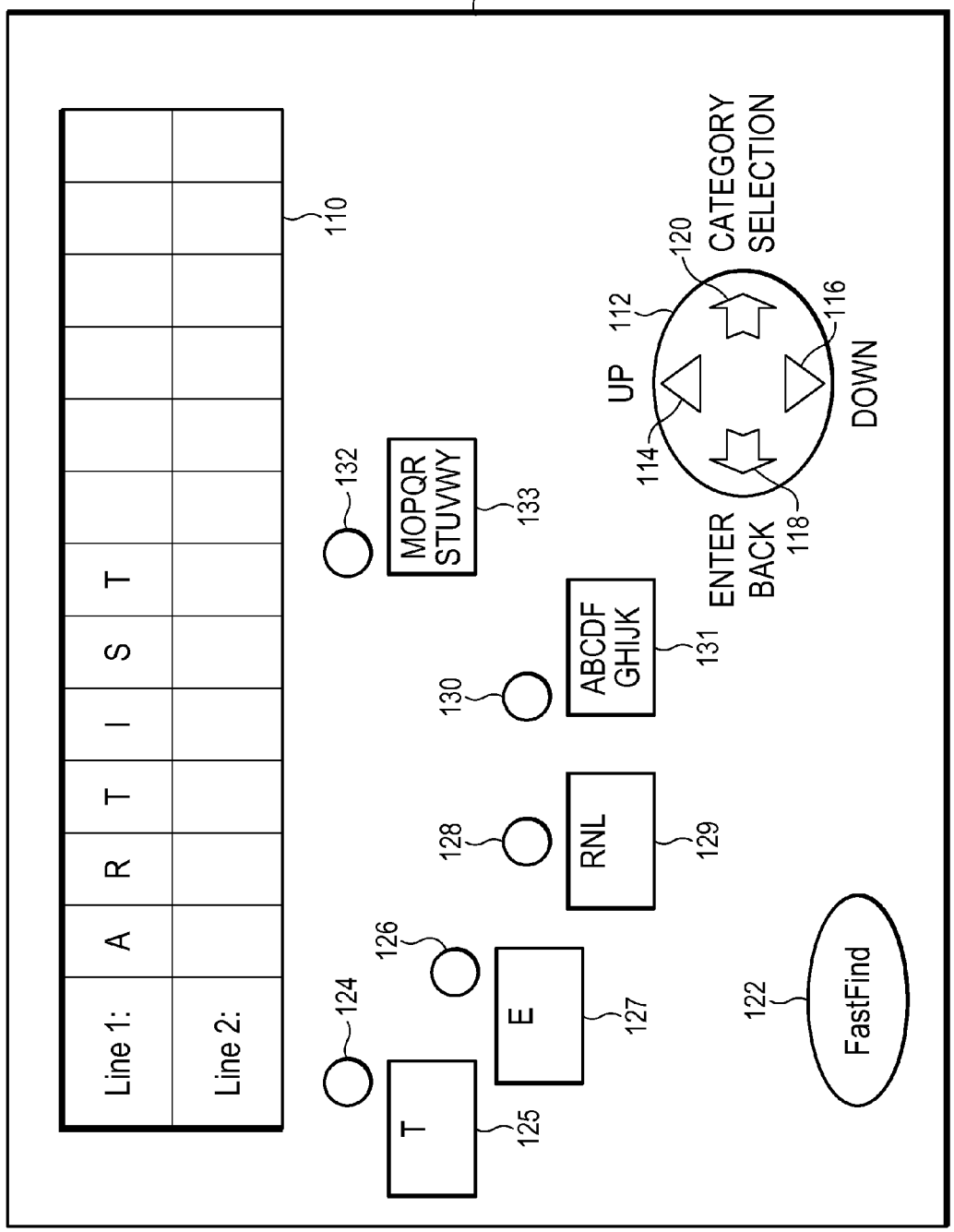
FIGS. 3A, 3B, 3C, 3D and 3E are front plan drawings of the display of the portable audio device shown in FIG. 1 which are useful for describing the operation of the invention.
Figure 3B:
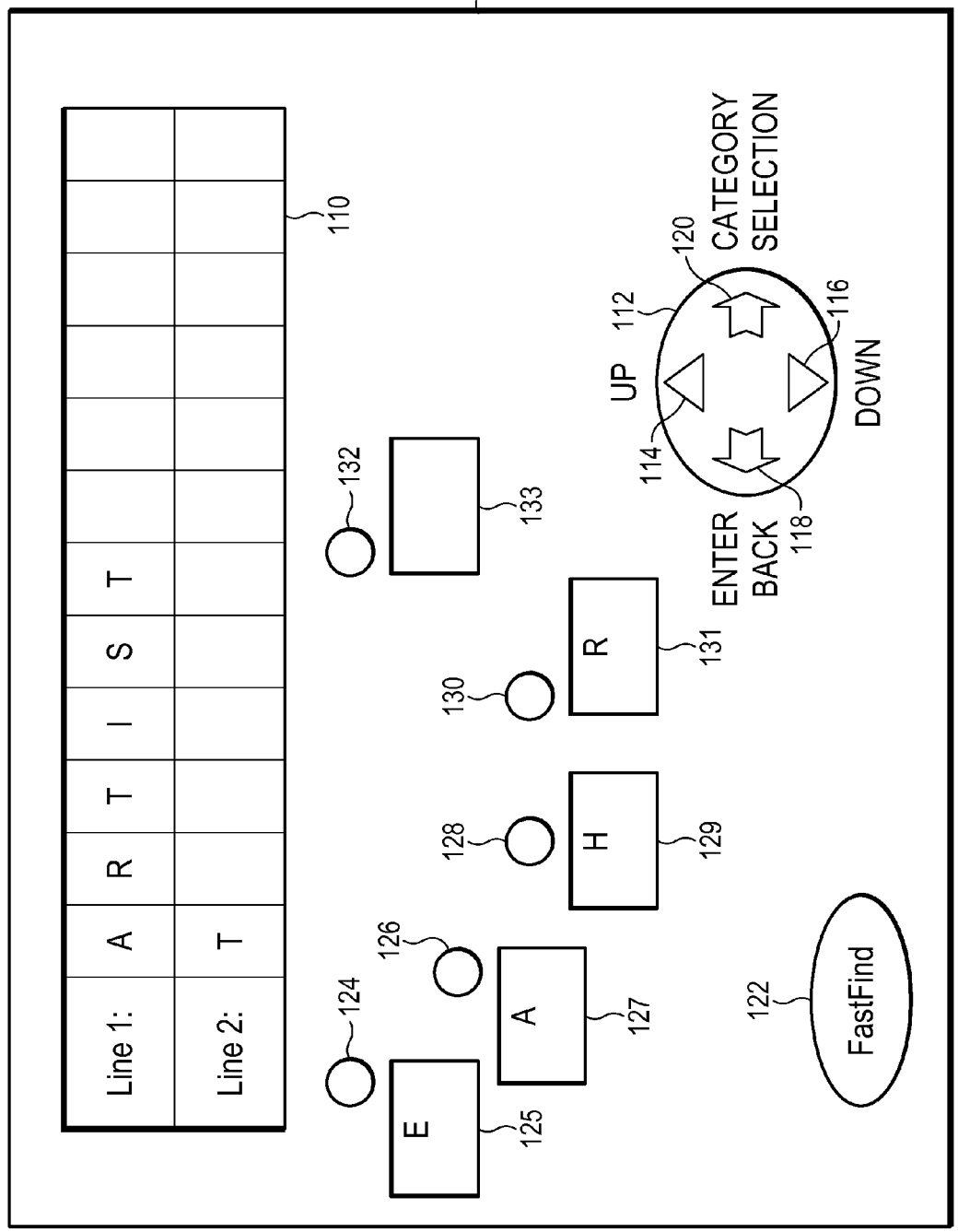

In this example, the artists in the list whose names begin with "T" include "Tate," "Tear," "Teaser," "Threat," and "Treat." The user, in this example, wants to listen to titles by the artist "Teaser." After pressing the CATEGORY SELECTION button 120 several times until "ARTIST" is displayed in Line 1 of display 110, the user selects the letter "T" as the first letter of the artist's name by pressing the search switch 124. This causes the letter "T" to appear in the first space of Line 2 of the display 110 and also changes the letters shown in the button displays 125, 127, 129, 131 and 133. As shown in FIG. 3B, the displays 125, 127, 129, 131 now contain the letters "E," "A," "H" and "R," respectively. Because these letters are the only letters appearing in the second position of an artist's name beginning with "T," the button display 133 is empty.

Figure 3C:
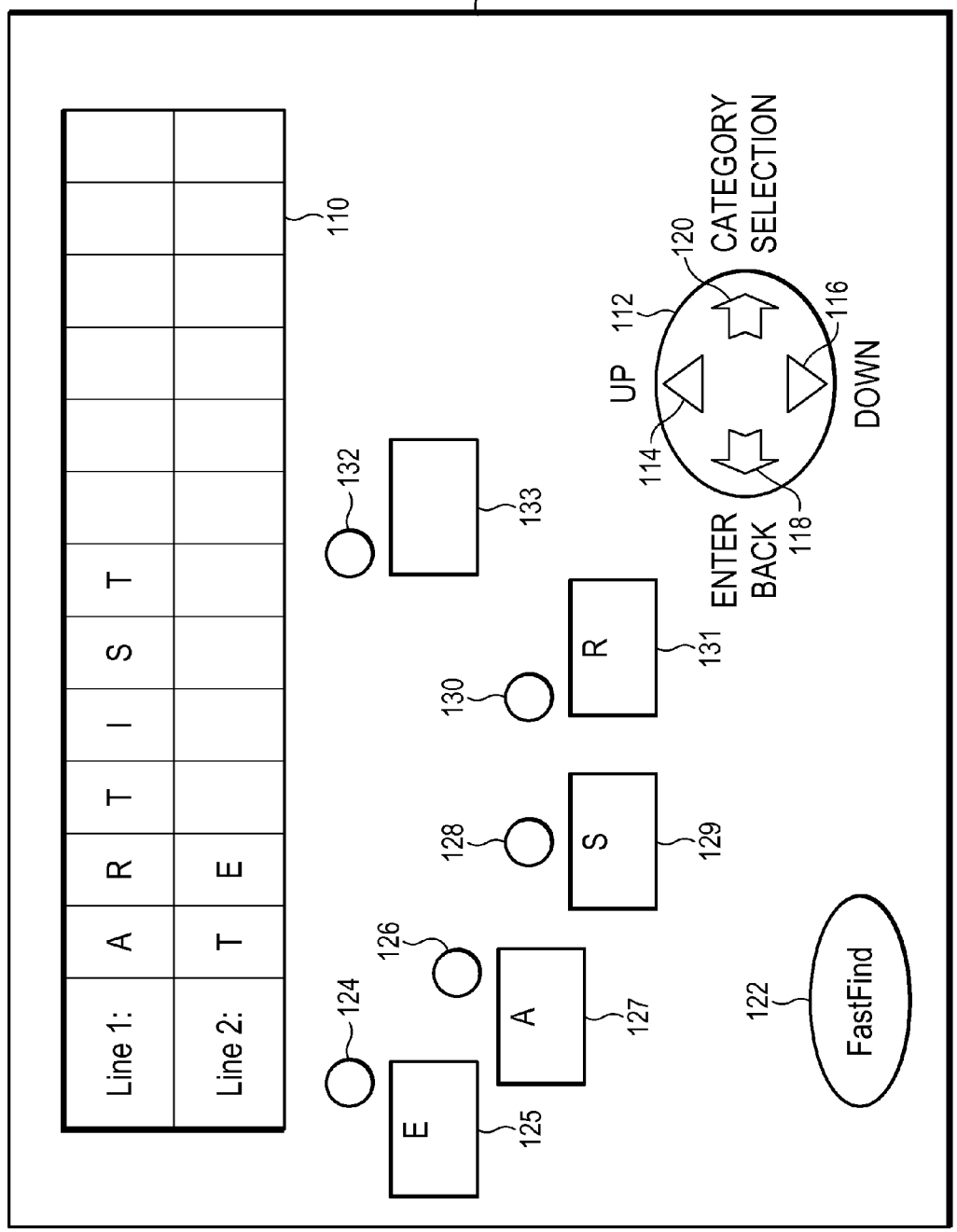
Figure 3D:
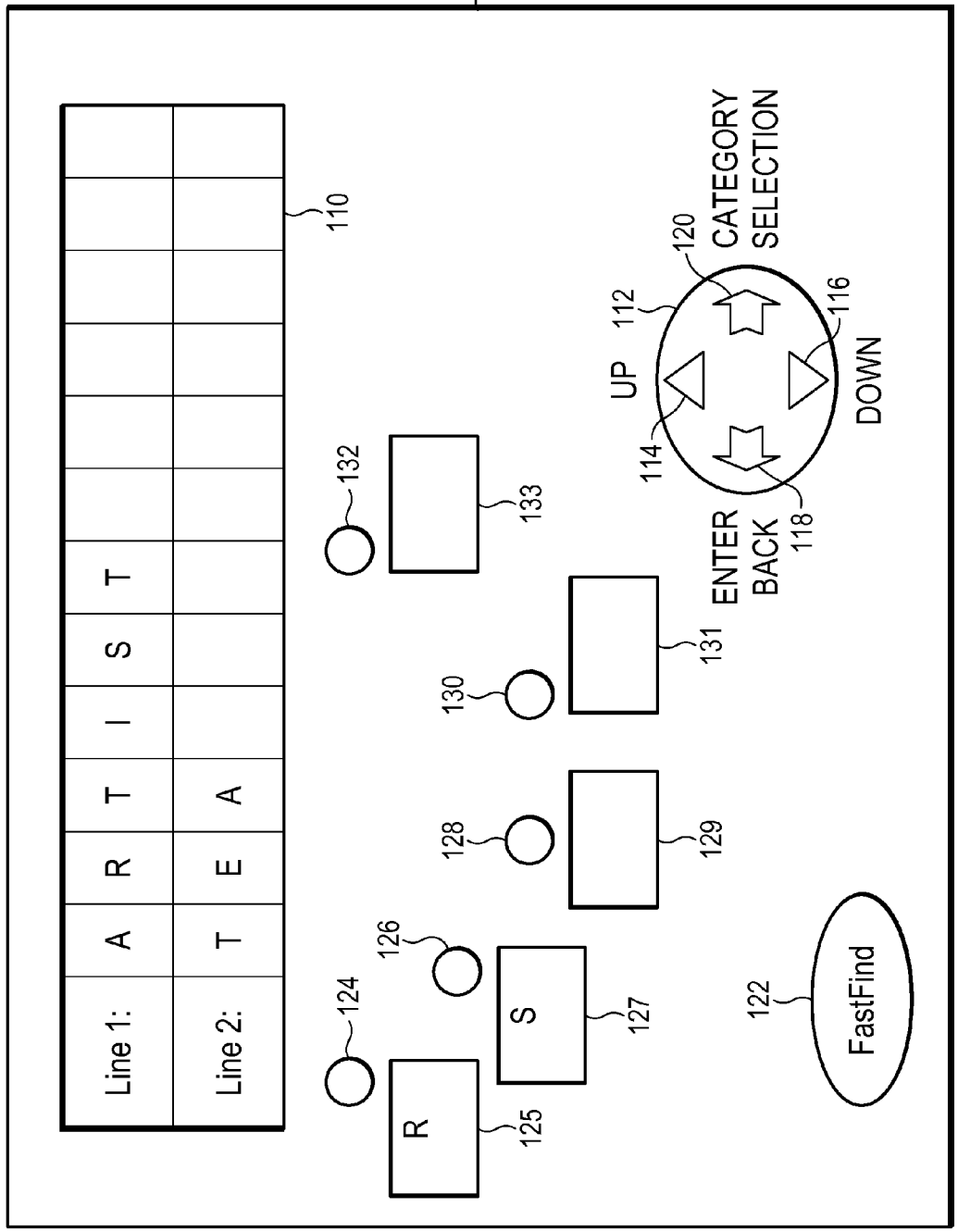
Figure 3E:
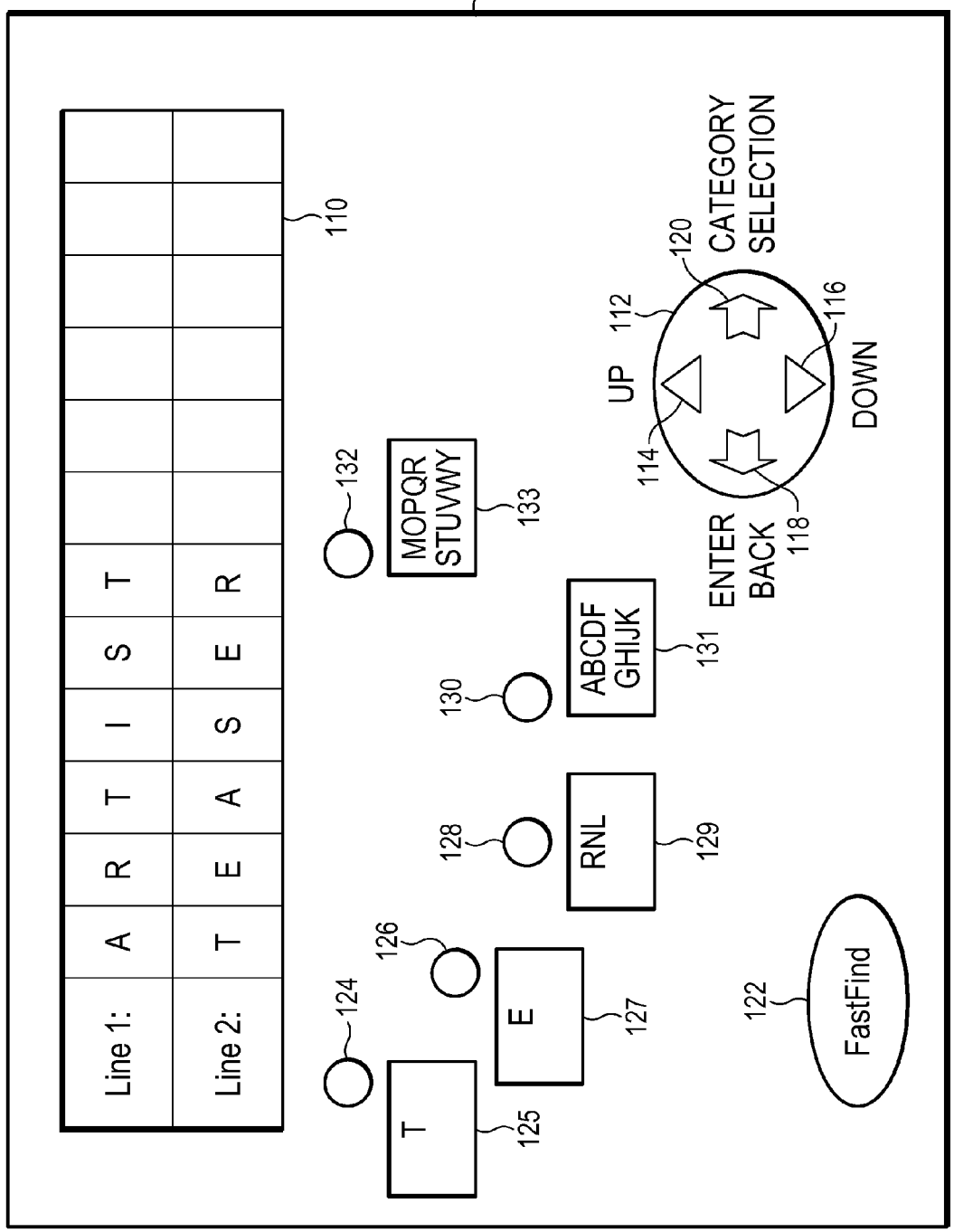

Next, the user presses key 124 to select the letter "E" as the second letter in the artist's name. FIG. 3C shows the exemplary portable music device after this step. Note that the letter "E" has been entered into the second position of Line 2 of the display 110 but, in addition, the letter "A" has been entered into the third position. This is because both of the artist's names that begin with "TE" have "A" at the third letter. Only the search button displays 125 and 127 show letters. Display 125 shows the letter "R" assigned to search button 124 and display 127 shows the letter "S" assigned to button 126. Only these letters are displayed because these are the only possible letters following the letters "TEA" for an artist's name. The final step is to press search button 126 to select the letter "S." After this step, as shown in FIG. 3D, Line 2 of the display shows the artist's name as "TEASER" and the button displays 125, 127, 129, 131 and 133 show the same letters as in FIG. 3A. The user then presses the CATEGORY SELECTION key a number of times until "TITLE" is displayed in Line 1 of the display 110, selects a title by the artist Teaser in the same manner as described above with reference to FIGS. 3A through 3D and presses the enter key 118 to play the title.

The third approach, described above, does not employ the four/five search buttons used for the first two approaches. Instead of pressing a sequence of buttons to which corresponding sets of letters are assigned, the user is sequentially guided to confirm or skip specific letters from left to right in Line 2 of the display 110. In this exemplary portable music device, the search buttons 124, 126, 128, 130 and 132 may be replaced by a single ADVANCE search switch (not shown).

According to this aspect of the invention, once the user has selected a particular category (e.g. TTL) using the FF button 122, the exemplary portable music device displays a first letter which is the most likely first letter in the list of all titles stored in the device 100. If, for example, the most likely first letter among all of the titles in the list is "L," the letter L will first appear on Line 2 as soon as the TTL category is selected. If "L" is not the first letter of the desired title, the user presses the ADVANCE button to move to the next most likely first letter (for example "T"). Once the proper first letter is displayed in the first position of Line 2 of the display 110, the user presses the ENTER key 118. This action causes the currently displayed letter to be selected, causes the cursor to move to the right and causes the most likely second letter in the group of all titles that start with the first letter selected to be displayed. If this second letter is not the proper second letter for the desired title, the user presses the ADVANCE button and the next most likely second letter appears on the screen. This process continues until the correct choice is reached or until the user changes mode to manual by pressing the UP-DOWN button. The "most likely" letter in any position may be the one having the greatest frequency, given the preceding letters, among the items in the selected category. Alternatively, the "most likely" letter may be determined by the frequency with which the user has selected the desired item.

The following is an example of the most-likely letter selection. In this example, the user is searching for the title TARARAM. The first step in this process is shown in FIG. 4A. The user begins by repeatedly pressing the FF button 122 until TTL is displayed in Line 1 of the display 110, indicating that the user wants to search in the Title category. As shown in FIG. 4A, once the TTL category is displayed in Line 1 of the display 110, the letter "L" is displayed in Line 2. This letter is displayed because it is the most likely first letter among all of the titles stored in the portable music player 100. Because, however, the desired title TARARAM does not begin with the letter "L," the user presses the ADVANCE key until the letter "T" is displayed in the first position of Line 2 of the display, as shown in FIG. 4B. Because this letter is the first letter of the desired title, the user presses the ENTER key 118 to accept this letter as the first letter in the title.

As soon as the letter "T" has been selected in the first position of Line 2, as shown in FIG. 4C, the exemplary portable music player displays the letter "E" in the second position. This letter is displayed because it is the most frequently occurring letter following the letter "T" in the list of titles. Because "E" is not the second letter of the desired title, however, the user presses the ADVANCE key until, as shown in FIG. 4D, the letter "A" is displayed in the second position of Line 2. In this exemplary embodiment, the desired title TARARAM is the only title that begins with the letters "TA." Thus, as shown in FIG. 4E, when the user presses the ENTER key after the letter "A" is displayed in the second position of Line 2, the portable player 100 displays the desired title TARARAM in Line 2 of the display 110. The user may then play the title by pressing the ENTER key 118.

At any time before a unique selection has been made the UP-DOWN keys may be pressed, to change to the manual mode. In the manual mode the first title having the previously selected letters is displayed. If the user enters the manual mode before any first letter has been selected, the device selects the currently displayed letter and displays the first title in the list beginning with that letter. In manual mode, when the last title having a given first letter has been displayed, the next title is the first title in the list that begins with the second most likely first letter. Once, the searched for title is displayed in Line 2 of the display 110, the user may press the ENTER button 118 to play the title.

The final alternative approach uses only the UP-DOWN buttons as the search switches (instead of the five letter buttons or the single ADVANCE button) for searches. In this exemplary approach, the player 400, shown in FIG. 5, maintains a list of all of the titles sorted alphabetically (e.g. from A to Z) by the first letter and then by the second letter and so on. This method uses a binary search algorithm on the titles in the database. In this embodiment of the invention, when the user has selected the desired category, a title is displayed in Line 2 of the display 110. This title is at the center of the list for the selected category. If the desired name is alphabetically earlier than the displayed name, the user pushes the LESS button 410. If, on the other hand, the desired name is alphabetically later the displayed name, the user pushes the MORE button 412. Line 2 of the display then shows the name which is alphabetically centered between the previously displayed entry and the first or last name, respectively, in the database. For example, if the displayed name is "CRAZY" and the desired name is "SILLY" the MORE button 412 is pressed. If the next displayed name is "FOREVER" (the center of the remaining list between CRAZY and the last name in the list), the user again presses the MORE button 412 as "SILLY" is later in the alphabet than "FOREVER". This process is repeated until the correct name is displayed on the screen. Using this method, the length of the list being searched is halved every time one of the buttons MORE 412 and LESS is pressed. It is easy to show that the user will use at most N button presses to reach the desired name, where N is the smallest integer that satisfies the condition $2^N \geq$ list-size.

Figure 6:
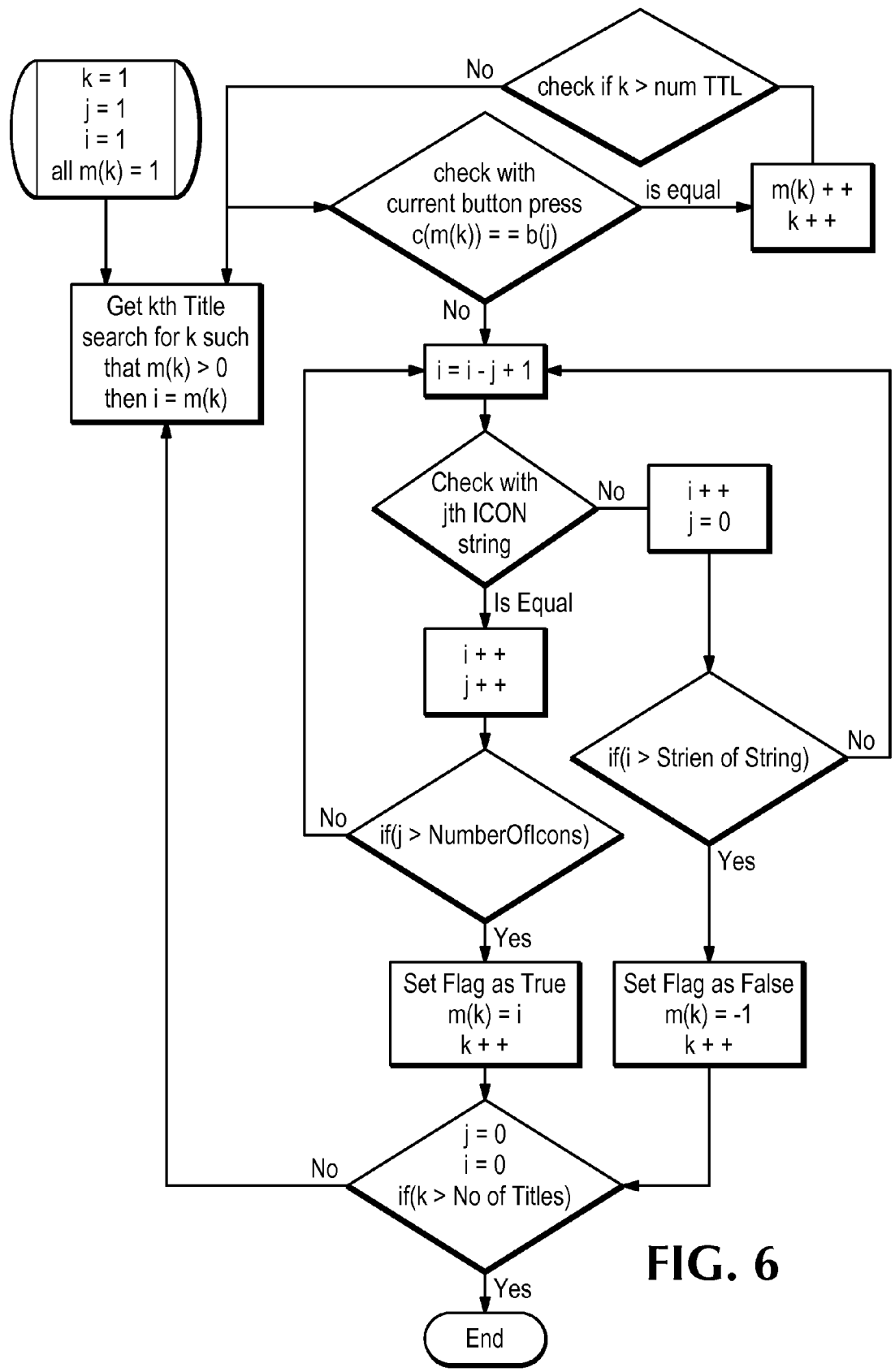
FIG. 6 is a flow-chart diagram of a first exemplary wild-card fast-find algorithm.
Figure 7:
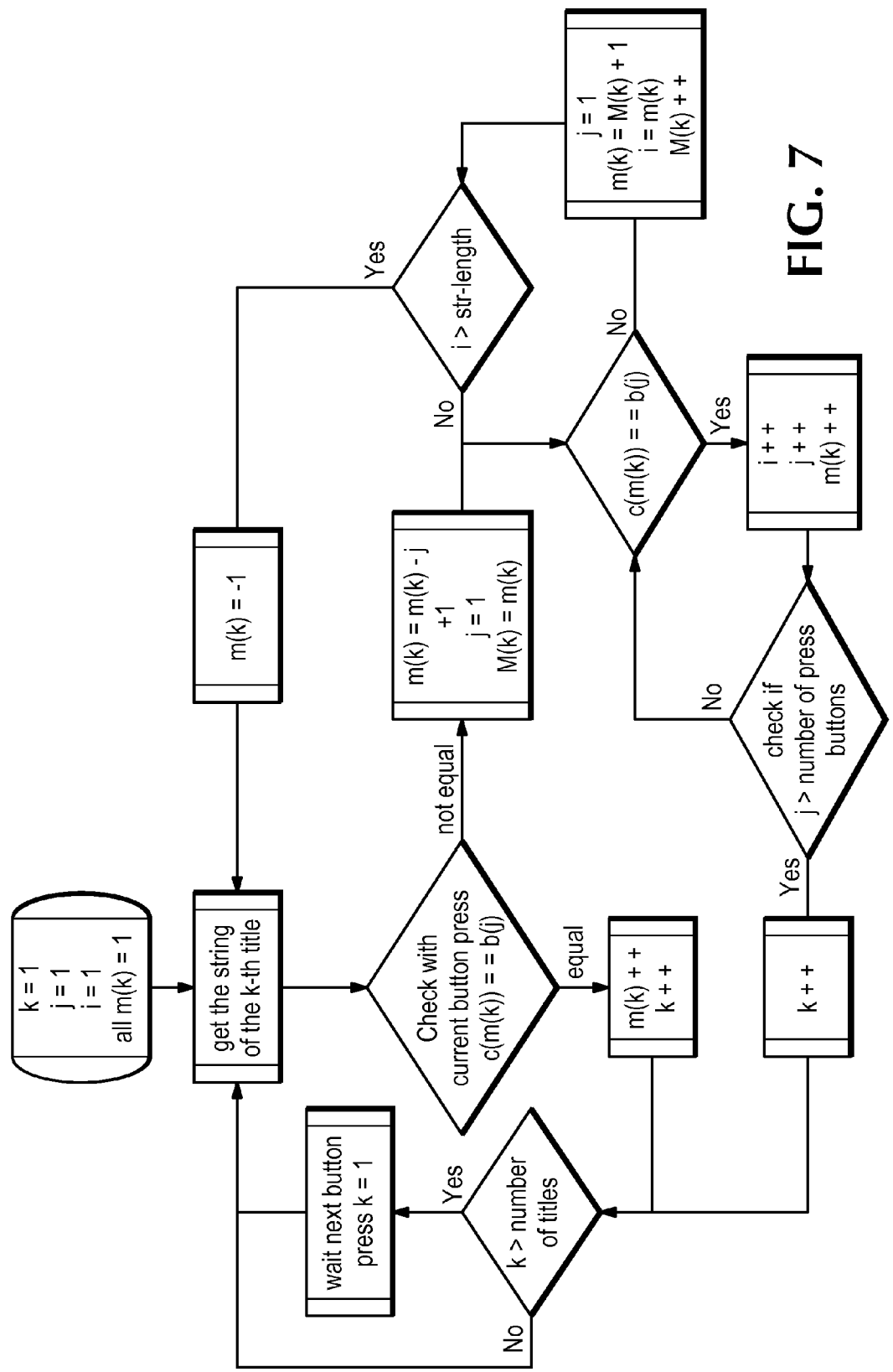
FIG. 7 is a flow-chart diagram of a second exemplary wild-card fast-find algorithm.

FIGS. 6 and 7 are flow-chart diagrams of exemplary wild-card fast-find algorithms according to the subject invention. In these Figures, the variable i is used as the index of the character string s. The variable j is the button press index, the variable k is the index for the title note, the array m(k) is the index within the k-th string marking the occurrence of a match. This entry is −1 to indicate an invalid entry. The array c(i) is the character at the i-th position within the string. The array b(i) is a Boolean array that is used to indicate a match.

Connected DVD or CD players (not shown) or set-top boxes (STBs) (not shown) can use these techniques, employing a television screen for a display and the remote control of the DVD or STB (not shown) for the "selection" process, to find a desired entry among multiple entries on one or more DVD's or CD's. Also, MP3-capable CD or DVD players that are not connected to an entertainment system can use these methods to navigate lists CD-MP3 titles. Many DVD and CD players can hold more than a single disc (when they have a changer). The number of titles increases with the number of discs and so does the navigation complexity. These devices typically maintain a global table of contents for all of the titles on all of the discs. The above methods can be applied to this global table of contents to substantially improve navigation.

The present invention has been described in terms of several navigation methods specially tailored for use with a relatively large associated database of title, artist and genre names. The approach allows different modes of search that are very efficient especially for small footprint devices such HD Jukeboxes, CD-MP3 players and small PC networked devices that contain a large selection of titles.

Although the invention has been described in terms of a combination of hardware and software, it is contemplated that it may be practiced entirely in software stored on a computer-readable carrier such as a magnetic or optical disc, or a memory card. The exemplary software controls a computer to perform the inventive function.

While the invention has been described in terms of exemplary embodiments, it is contemplated that it may be practiced, as described above, with modifications within the scope of the attached claims.

The invention claimed is:

1. A content navigation method on a mobile device including a control switch, a selection switch, and a plurality of search switches, the method comprising:
    entering a pattern search mode by receiving an indication of activation of the selection switch;
    indicating a search pattern by receiving an indication of activation of at least one search switch once, wherein the search pattern includes a subset of characters associated with the at least one search switch and wherein other subsets of characters are associated with other corresponding search switches;
    identifying a set of names corresponding to a set of content objects stored in a storage device responsive to the search pattern, the set of names including one or more names each including in a first character position the subset of characters associated with the at least one search switch;
    responsive to the set of names including only one name with the search pattern, displaying the one name;
    responsive to the set of names including more than the one name with the search pattern, displaying in a first display position at least one place holder character associated with at least one of the subset of characters included in the set of names; and
    repeating the entering, indicating, identifying for subsequent character positions, and displaying in subsequent display positions further ones of the at least one place holder for subsequent search patterns until the set of names includes only the one name;
    wherein the at least one place holder character is associated with the more than one name and a count of unresolved characters in the set of names.

2. The content navigation method of claim 1 further comprising:
    remotely coupling the storage device to the mobile device through a network;
    transmitting the indication of activation of the selection switch from the mobile device to the storage device through the network;
    transmitting the set of names from the storage device to the mobile device through the network;
    receiving an indication of activation of a control switch to make a selection between the one name or one of the set of names displayed in a predetermined order; and
    transmitting a content object corresponding to the selection from the storage device to the mobile device responsive to receiving an indication of the activating of the control switch.

3. The content navigation method of claim 1 further comprising receiving an indication of activation of a control switch to scroll through the set of names displayed in a predetermined order.

4. The content navigation method of claim 1 further comprising activating a selection switch to select one of the plurality of search categories, wherein each of the plurality of search categories is associated with a corresponding number of activations of the selection switch.

5. The content navigation method of claim 1 further comprising activating a control switch to enter a manual mode.

6. The content navigation method of claim 1 further comprising uniformly assigning different sets of characters to each of the plurality of search switches.

7. The content navigation method of claim 1 further comprising non-uniformly assigning different sets of characters to each of the plurality of search switches.

8. The content navigation method of claim 1 further comprising assigning different sets of characters to each of the plurality of search switches according to a frequency of occurrence of each particular character in a plurality of names associated with a plurality of content objects.

9. A computer-implemented content navigation method, comprising:
    receiving an indication of activation of a search switch having associated therewith a subset of alphanumeric characters;
    identifying a set of names associated with a corresponding set of content objects stored in a storage device responsive to the indication of activation, the set of names including at least one name having in a first character position at least one character in the subset of alphanumeric characters;
    responsive to the set of names including only one name having in the first character position the at least one character, displaying the one name;
    responsive to the set of names including more than the one name having in the first character position the at least one character, displaying in a first display position at least one place holder character associated with the at least one character in the subset of alphanumeric characters included in the set of names; and
    displaying in each subsequent display position subsequent instances of the at least one place holder character for subsequent indications of activations of any of a plurality of search switches until the displaying the only one name;
    wherein the at least one place holder character represents a count of unresolved characters in the set of names.

10. The computer-implemented content navigation method of claim 9 further comprising:
    transmitting an indication of the activating of the search switch from a remote player including the plurality of search switches coupled to the storage device through a network;
    transmitting the set of names from the storage device to the remote player;
    receiving an indication of activation of a control switch to select a displayed name on the remote player; and
    transmitting a content object corresponding to the selected displayed name from the storage device to the remote player responsive to receiving an indication of the activating of the control switch.

11. The computer-implemented content navigation method of claim 9 further comprising receiving an indication of activation of a control switch to switch to manual selection mode or to select the one name displayed.

12. The computer-implemented content navigation method of claim 9 further comprising receiving an indication of activation of a selection switch to select one of a plurality of search categories, wherein each of the plurality of search categories is associated with a corresponding number of activations of the selection switch.

13. The computer-implemented content navigation method of claim 9 further comprising uniformly assigning different sets of characters to each of the plurality of search switches.

14. The computer-implemented content navigation method of claim 9 further comprising non-uniformly assigning different sets of characters to each of the plurality of search switches.

15. The computer-implemented content navigation method of claim 9 further comprising assigning different sets of characters to each of the plurality of search switches according to a frequency of occurrence of each particular character in a plurality of names associated with a plurality of content objects.

16. A device, comprising:
a plurality of search switches each having assigned a corresponding subset of alphanumeric characters;
a controller coupled to the plurality of search switches and configured to identify a set of names associated with a corresponding set of content objects stored in a storage device responsive to activation of one of the search switches, the set of names including one or more names each having one or more characters in the subset of alphanumeric characters;
a display coupled to the controller configured to display one name in the set of names responsive to the controller identifying only the one name having the one or more characters in the subset of alphanumeric characters and configured to display subsequent instances of the at least one place holder character responsive to subsequent activation of additional search switches and identification of subsequent sets of names each having one or more characters in subsequent subsets of alphanumeric characters until the display of the one name; and
a control switch coupled to the controller and configured to select the one name displayed;
where the at least one place holder character represents plural names and a count of unresolved characters in the set of names;
where the set of content objects includes at least one of a video or audio content object.

17. The device of claim 16 where the storage device is remotely coupled to the mobile device via a network.

18. The device of claim 16 where the controller is configured to uniformly assigning the subset of alphanumeric characters to the plurality of search switches.

19. The device of claim 16 where the controller is configured to non-uniformly assigning the subset of alphanumeric characters to the plurality of search switches.

20. The device of claim 16 where the controller is configured to assigned the subset of alphanumeric characters to the plurality of search switches depending on a frequency of occurrence of each character in a plurality of names associated with a corresponding plurality of content objects.

21. The device of claim 16 where the controller is configured to control the storage device.

22. The device of claim 16 where the display includes:
a first region to display one of the plurality of search categories, wherein each of the plurality of search categories is associated with a corresponding number of activations of a selection switch; and
a second region to display the one name or the at least one place holder character.

23. The device of claim 16 further comprising a plurality of search displays distinct from the display, each search display associated with one of the plurality of search switches.

24. The device of claim 16 where each of the plurality of search displays is configured to display the set of characters assigned to each of the corresponding search switches.

25. The device of claim 24 where the controller is configured to dynamically assign characters to each of the search switches according to a frequency of occurrence of each character in a plurality of names associated with a corresponding plurality of content objects.

26. A mobile device, comprising:
means for receiving an indication of activation of one of a plurality of search switches having associated therewith a subset of characters;
a storage device configured to store a set of content objects;
means for identifying a set of names associated with the set of content objects stored in the storage device responsive to the means for activating the one of the plurality of search switches, the set of names including one or more names each having in a first character position one or more characters in the subset of characters;
responsive to the set of names including only one name having in the first character position the one or more characters in the subset of characters, means for displaying the one name;
responsive to the set of names including more than the one name having in the first character position the one or more characters in the subset of characters, means for displaying in a first display position at least one place holder character associated with the one or more characters in the subset of characters included in the set of names; and
means for repeatedly receiving the indication of activation for subsequent character positions, means for identifying, and means for displaying in subsequent display positions further ones of the at least one place holder character for subsequent indications of activations of any of the plurality of search switches until the means for displaying displays only the one name;
wherein the at least one place holder character represents plural names and a count of unresolved characters in the set of names.

27. The mobile device of claim 26 further comprising:
means for transmitting the indication of activation of the one of the plurality of search switches from a remote player including the plurality of search switches coupled to the storage device through a network;
means for transmitting the set of names from the storage device to the remote player;
means for indicating the activation of a control switch to select a displayed name on the remote player; and
means for transmitting a content object corresponding to the selected displayed name from the storage device to the remote player responsive to receiving an indication of the activating of the control switch.

28. The mobile device of claim 26 further comprising means for indicating activation of a control switch to switch to manual selection mode or to select the one name displayed.

29. The mobile device of claim 26 further comprising means for indicating activation of a selection switch to select one of the plurality of search categories, wherein each of the plurality of search categories is associated with a corresponding number of activations of the selection switch.

30. The mobile device of claim 26 further comprising means for indicating activation of a control switch to enter a manual mode.

31. The mobile device of claim 26 further comprising means for uniformly assigning different subsets of characters to each of the plurality of search switches.

32. The mobile device of claim 26 further comprising means for non-uniformly assigning different subsets of characters to each of the plurality of search switches.

33. The mobile device of claim 26 further comprising means for assigning different subsets of characters to each of the plurality of search switches according to a frequency of occurrence of each particular character in a plurality of names associated with a plurality of content objects.

34. An article of manufacture including a non-transitory computer-readable medium having stored thereon computer executable instructions that configure a computing device or computing system to perform operations comprising:
- receiving an indication of activation of one of a plurality of search switches having associated therewith a subset of characters;
- identifying a set of names associated with a corresponding set of content objects stored in a storage device responsive to the activating the one of the plurality of search switches, the set of names including one or more names each having in a first character position one or more characters in the subset of characters;
- responsive to the set of names including only one name having in the first character position the one or more characters, displaying the one name;
- responsive to the set of names including more than the one name having in the first character position the one or more characters, displaying in a first display position at least one place holder character associated with the one or more characters in the subset of characters included in the set of names; and
- repeating the receiving the indication of activation of the one of the plurality of search switches for subsequent character positions, identifying, and displaying in subsequent display positions further ones of the at least one place holder character for subsequent activations of any of the plurality of search switches until the displaying the only one name;
- wherein the at least one place holder character represents plural names and a count of unresolved characters in the set of names;
- wherein the set of content objects includes at least one of a video or audio content object.

35. The article of manufacture of claim 34 further comprising:
- transmitting the indication of activation of the one of the plurality of search switches from a remote player including the plurality of search switches coupled to the storage device through a network;
- transmitting the set of names from the storage device to the remote player;
- activating a control switch to select a displayed name on the remote player; and
- transmitting a content object corresponding to the selected displayed name from the storage device to the remote player responsive to receiving an indication of the activating of the control switch.

36. The article of manufacture of claim 34 further comprising activating a control switch to switch to manual selection mode or to select the one name displayed.

37. The article of manufacture of claim 34 further comprising receiving an indication of activation of a selection switch to select one of the plurality of search categories, wherein each of the plurality of search categories is associated with a corresponding number of activations of the selection switch.

38. The article of manufacture of claim 37 further comprising activating a control switch to enter a manual mode.

39. The article of manufacture of claim 34 further comprising uniformly assigning different subsets of characters to each of the plurality of search switches.

40. The article of manufacture of claim 34 further comprising non-uniformly assigning different subsets of characters to each of the plurality of search switches.

41. The article of manufacture of claim 34 further comprising assigning different subsets of characters to each of the plurality of search switches according to a frequency of occurrence of each particular character in a plurality of names associated with a plurality of content objects.

* * * * *

UNITED STATES PATENT AND TRADEMARK OFFICE
CERTIFICATE OF CORRECTION

| | | |
|---|---|---|
| PATENT NO. | : 7,934,236 B1 | |
| APPLICATION NO. | : 10/313688 | |
| DATED | : April 26, 2011 | |
| INVENTOR(S) | : Amir et al. | |

It is certified that error appears in the above-identified patent and that said Letters Patent is hereby corrected as shown below:

Title page, item (75), under "Inventors", in Column 1, Line 3, delete "Newton," and insert -- Newtown, --.

Title page, item (57), under "Abstract", in Column 2, Line 13, delete "an" and insert -- a --.

Column 13, Line 52, in Claim 20, delete "assigned" and insert -- assign --.

Signed and Sealed this
Fourth Day of October, 2011

David J. Kappos
*Director of the United States Patent and Trademark Office*